United States Patent [19]
McMullen et al.

[11] 3,879,608
[45] Apr. 22, 1975

[54] WORKPIECE SHAPE - INSENSITIVE RADIATION GAUGING OF ROD-LIKE MATERIALS

[75] Inventors: James Michael McMullen, Charlotte, Vt.; Elmer Wilbert Sturkol, Columbus, Ohio

[73] Assignee: Industrial Nucleonics Corporation, Columbus, Ohio

[22] Filed: June 25, 1970

[21] Appl. No.: 49,893

[52] U.S. Cl. ............................................. 250/359
[51] Int. Cl. .............................................. G01t 1/16
[58] Field of Search .......... 250/83.3 D, 105, 106 S, 250/358, 359, 360, 496; 209/111.5

[56] References Cited
UNITED STATES PATENTS

| | | |
|---|---|---|
| 2,858,450 | 10/1958 | Holben .............................. 250/105 |
| 3,027,459 | 3/1962 | Alcock et al. ................. 250/83.3 D |
| 3,240,940 | 3/1966 | Dukes et al. .................... 250/83.3 D |

*Primary Examiner*—James W. Lawrence
*Assistant Examiner*—Davis L. Willis
*Attorney, Agent, or Firm*—C. Henry Peterson; William T. Fryer, III

[57] ABSTRACT

Specifically disclosed herein is a method and apparatus whereby a rod-like workpiece such as a cigarette rod is gauged by passing it between a beta radiation source and a radiation detector, and the sensitivity of the instrument to changes in the cross-sectional shape of the rod is minimized by placing a "center blanking bar" made from a substantially "infinite absorber" material in the radiation beam which is incident on the rod, so as to reduce the radiation intensity passing through the center of the rod.

8 Claims, 5 Drawing Figures

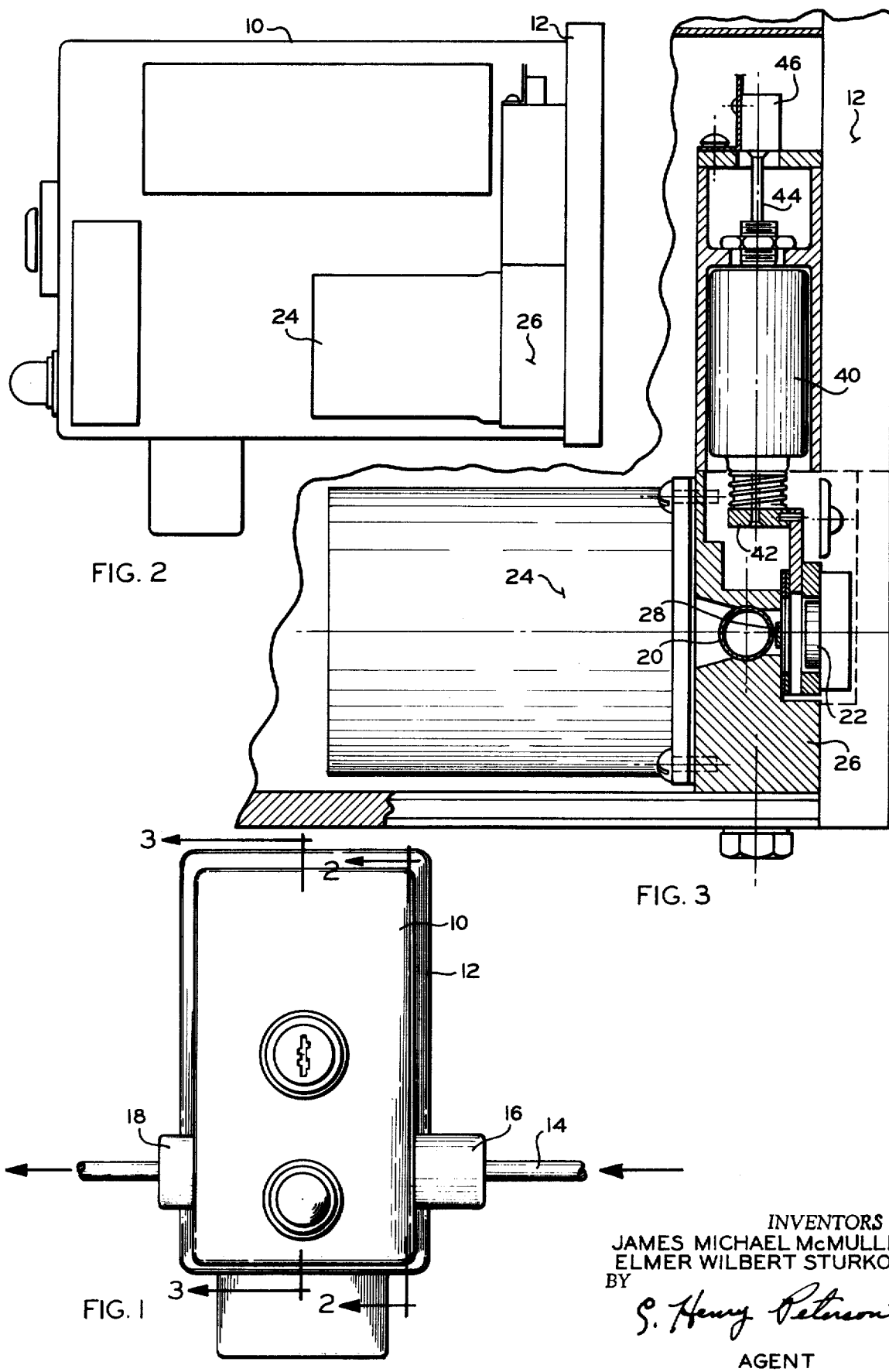

PATENTED APR 22 1975         3,879,608

INVENTORS
JAMES MICHAEL McMULLEN
ELMER WILBERT STURKOL
BY
G. Henry Peterson

AGENT

WORKPIECE SHAPE - INSENSITIVE RADIATION GAUGING OF ROD-LIKE MATERIALS

This invention relates to a radiation gauge for measuring traveling materials in the form of rods, strands, bundles of fibers and the like, and more particularly it relates to a method and means for minimizing the effect on the measurements of changes in the cross-sectional shape of the material.

The invention is herein illustrated and described in connection with the design and use of a gauge for measuring the weight per unit length of a continuous cigarette rod issuing from the rod-forming mechanism of a cigarette maker. One prior geometric arrangement of a cigarette gauge source and detector geometry which has had outstanding commercial success is described in the Dukes et al. Pat. No. 3,240,940. However, in recent years there is an ever-increasing demand for higher and higher accuracy in the measurement and control of the cigarette making process, together with a demand for higher and higher production speeds. Hence, sources of error which previously were considered minor or went unnoticed are found to have increasing economic significance, and efforts are directed towards their elimination.

One such source of error is the shape sensitivity of cigarette gauges which manifests itself as a slight shift in the calibrated output signal from the gauge when the nominally circular cross-section of the cigarette rod being produced changes from one degree of ellipticity to another. Such a change in the cross-sectional shape and the accompanying mass distribution occurs, for example, when the operator adjusts the sealer of the rod-forming mechanism. Occasionally, a significant shape change occurs even when a minor accumulation of glue is cleaned out of the sealer, especially when the cleaning and closing of the sealer is done in a careless manner.

Early prior recognition of this or a similar problem is attested by the U.S. Patents to Gilman No. 2,861,683, Powell No. 2,920,207 and Fearnside No. 2,922,884. The devices of these patents, however, greatly complicate the mechanical structures as well as the electronic circuits by their requirements for multiple sources and detectors spaced around the periphery of the path of the rod or along the length of the path. The difficulties presented by these proposals become apparent on consideration of the practical requirements for source safety shutters and extremely high speed of response, such that over-weight or under-weight portions of the cigarette rod as short as one-sixth of a cigarette length can be detected, and the defective cigarette rejected, at the maker speeds of up to 10,000 cigarettes per minute which may be achieved within the next decade.

The present invention enables the objectionable shape sensitivity to be reduced to an acceptable degree, without reducing the intensity of the detected radiation to an unacceptable degree, by an arrangement for reducing the radiation intensity near the central portion of the workpiece. The rationale of the present invention is thus contrary to the explicit or implied theories of prior geometries such as that of Dukes et al., supra, or Gilman's British Patent No. 738,329. These geometries provide for concentrating the radiation flux on the diametrical or thickest portion of the cigarette rod, in Dukes et al. by the line source arrangement, and according to Gilman et al. by providing tapered shields around the path of the rod for strongly attenuating the radiation passing through the extremities of the cross-section thereof while permitting the radiation to pass freely through the central portion.

The objects of the present invention are to provide an improved method and apparatus for reducing the effect on the gauge measurements of changes in the cross-sectional shape of the mass distribution of a rod-like workpiece, utilizing a single source and detector; to provide such a method and apparatus which allows for a radiation-safety shutter between the path of the workpiece and the radiation source; to provide such an apparatus which is mechanically simple and uncomplicated, and to provide a gauge such as a cigarette gauge requiring no circuit complications which might interfere with its obtaining extremely high speed of response, all in a simple, economical and straightforward manner.

Further objects and advantages of the present invention will become apparent in the following detailed description of a preferred method and apparatus according to the invention, taken in conjunction with the appended drawings, in which:

FIG. 1 is a front elevation of a cigarette gauging head adapted to contain a radiation source and detector geometry according to the invention;

FIG. 2 is a layout diagram showing the general placement of the parts in the detector head of FIG. 1, with the view being taken generally along the line 2—2 of FIG. 1 but without sectioning the parts;

FIG. 3 is a partial section on the line 3—3 of FIG. 1, showing the source and detector geometry;

Figures 4, 5:
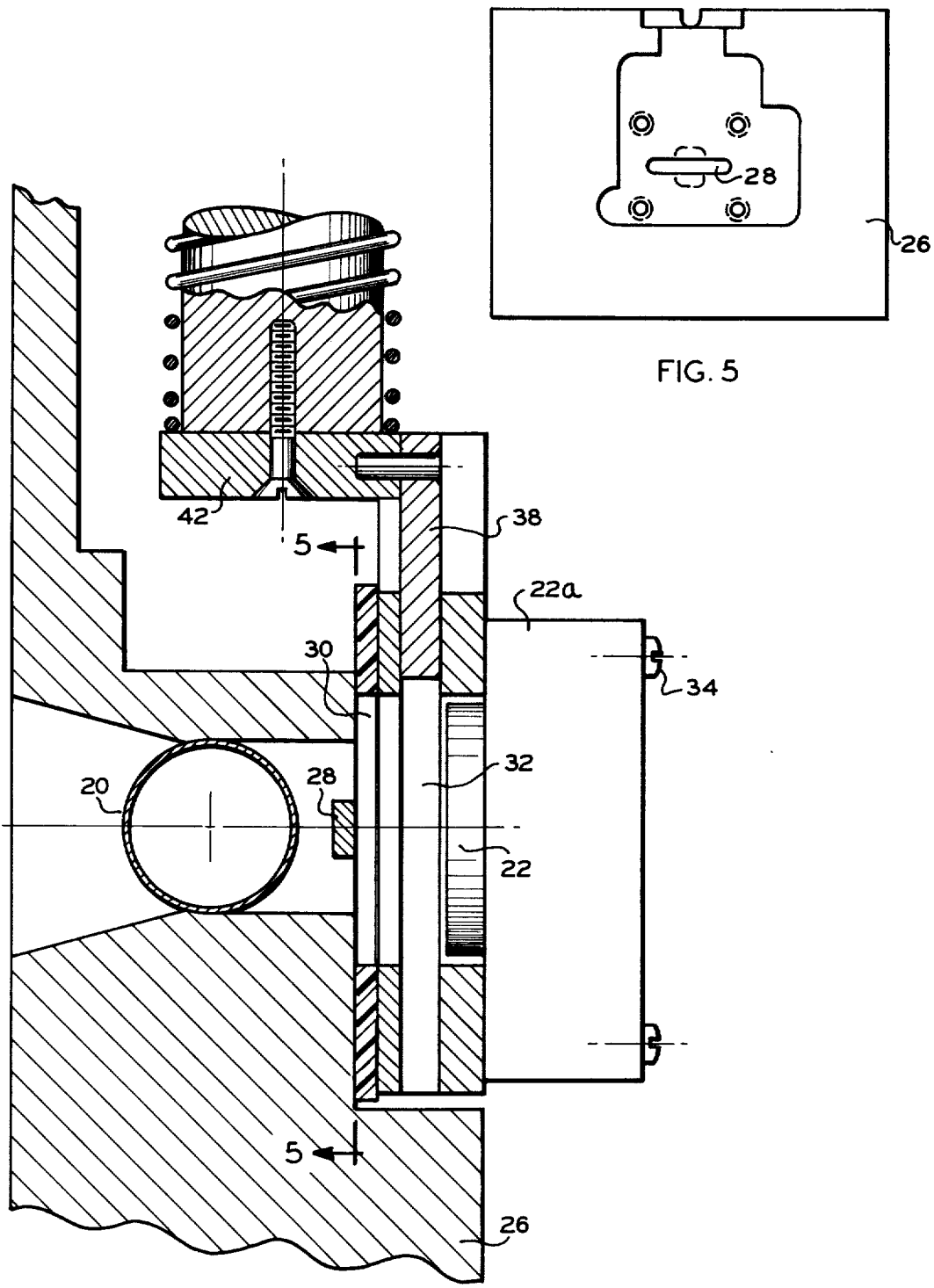
FIG. 4 is an enlargement of a portion of FIG. 3, showing in detail the parts associated with the center blanking arrangement.
FIG. 5 is a section on the line 5—5 of FIG. 4.

Referring now to the drawings, a gauging head 10 is mounted on a cigarette maker (not shown) and attached by bolts or the like (not shown) which secure the base plate 12 of the gauging head to the machine. The base plate is adapted to fit the particular type of cigarette maker used. The cigarette rod 14, issuing from the rod-forming mechanism of the maker and traveling in the direction of the arrows, enters the gauging head through an entrance guide 16 and exits from the gauging head through an exit guide 18.

In the gauging head shown, as adapted for measuring a standard-diameter cigarette rod, the entrance and exit guides have an inside diameter of 0.325 inches. Between the entrance and exit guides, the rod travels through an integral pass tube 20 which has a slightly larger inside diameter of 0.375 inches. The wall thickness of the pass tube where the radiation beam passes through the rod for measurement purposes has a thickness of 2 mils so as to be readily penetrable by beta radiation from a source 22, containing strontium-90 in the illustrated embodiment. The active area of the source is a ¼-inch diameter circular disc which faces toward the pass tube 20 and the radiation detector 24.

Between the source and the detector, the beta radiation from the source is collimated into a beam which intersects the path of the cigarette rod surrounded by the pass tube. The principal collimating device is a center block 26 of Mallory 1000 metal (an efficient shielding material) seven-eighths inches thick, which is bored transversely to accommodate the pass tube 20. The pass tube is ⅜ inches in diameter on the outside, except for the 2-mil thickness portion aforesaid. The collimating passage through the center block which intersects the pass tube is tapered outwardly at an angle of 9½° and terminates on the detector side to form a rectangular opening one-half inch high and 0.302 inches long in the direction of travel of the cigarette rod. The aperture is not tapered in the latter length direction.

On the source side of the pass tube, the collimating aperture is 0.300 inches high and 0.216 inches long in the direction of rod movement and is not tapered in either direction. At 28, a center blanking bar according to the present invention is made of brass (ASTMB36) 0.032 inches thick, 0.100 inches wide and 0.530 inches long. The bar is installed in a milled slot 0.32 inches deep, and centrally located over the collimating aperture on the source side of the center block, parallel to the pass tube.

The foregoing dimensions are adapted for measurement of a standard-diameter cigarette rod as aforesaid, in a gauge designed to provide individual-cigarette reject signals in response to under or over-weight cigarette segments one-sixth the length of a regular cigarette. The dimensions given will of course vary depending on the type of workpiece to be measured.

The 0.032-inch thickness of the blanking bar presents a substantially infinite-thickness absorber to the beta rays from the strontium-90-yttrium-90 isotopes in the source. The width of the bar is selected so as to reduce the undesirable shape sensitivity to an acceptable degree without reducing the intensity of the detected radiation to an unacceptable degree.

In the illustrated embodiment, the source activity is 100 millicuries, and the blanking bar reduces the detected signal by a factor of about one-half, thus obtaining acceptable shape-sensitivity without unacceptable loss of signal strength. Better insensitivity to changes in shape of the workpiece can be obtained by making the blanking bar wider. However, such increased width at the same time reduces the detector output signal to the point where sufficient resolution of the high-speed variations in the rod may not be obtained. It would of course be possible to increase the source activity somewhat as a compensating factor is greater shape insensitivity is necessary; however, this might require more shielding, a heavier source shutter and the like. It has been found that the selection of parameters as hereinbefore described provides an excellent compromise for the ordinary high-speed commercial cigarette gauge.

From the foregoing, it will be apparent that the present invention provides the effect of multiple sources of radiation using only one source. Moreover, it greatly simplifies the problem of how to arrange the protective shutter mechanism, in view of the fact that the beam-splitting function needs to take place close to the pass tube, thereby allowing the shutter to be placed between the source and the blanking bar.

Referring in particular to FIG. 4, it is seen that the shutter mechanism is mounted in a cutout portion of the shielding center block 26. Once the blanking bar is pressed into place, the next item to be installed in the cutout portion is a safety alarm grid 30 comprising a thin printed circuit board with an opening therein for the radiation beam from the source, with a fine wire stretched across the opening. The breaking of the fine wire grid, as by an object puncturing the pass tube, breaks the electrical circuit, in a known manner causing the shutter to close and an alarm to be sounded.

Between the safety alarm and the source is the shutter guide 32 which is secured to the center block 26 by screws passing through the shutter guide and the burglar alarm grid and engaging threaded holes in the center block. The radiation source mounting flange 22A is secured by two screws as at 34 which also pass through mounting holes in the shutter guide 32 and help to hold the guide and burglar alarm grid in place. It is seen that the radiation source occupies a region outside of the center block, extending into a cutout portion 36 of the mounting plate 12.

The shutter 38, which moves vertically in the guide 32, is operated by a solenoid 40 through a link 42. When the shutter is open, an auxiliary plunger 44 extending from the top of the solenoid operates a plunger switch 46, thereby providing a signal that the shutter is open.

What is claimed is:

1. In a gauging head including a detector responsive to radiation for measuring a property of an elongated, traveling workpiece in the form of a rod, said gauging head having means for guiding said workpiece for longitudinal movement along a path of travel, and a source for providing a beam of radiation intersecting said path, the improvement for reducing the effect on the measurements of changes in the cross-sectional shape of the mass distribution in said workpiece, which comprises blanking means positioned adjacent to said path on the side thereof toward said source for overshadowing a central portion of said path which would otherwise be freely irradiated by a central portion of said beam while effectively allowing edge portions of said path to be freely irradiated by edge portions of said beam.

2. Apparatus as in claim 1 including a shutter which is movable between a closed position wherein said shutter shields said workpiece path against said radiation from said source and an open position permitting said radiation to pass and form said beam intersecting said path, said blanking means being positioned between said workpiece path and said shutter in said closed position thereof.

3. Apparatus as in claim 1 wherein said guide means includes a pass tube surrounding said workpiece path and extending along the line of travel of said workpiece in the region where said radiation beam intersects said path, said pass tube having thin walls at least in said region for allowing said beam to pass through said walls and said workpiece, and wherein said blanking means is positioned directly adjacent to the outer wall of said pass tube on the side thereof next to said source.

4. Apparatus as in claim 3 wherein said guide means further includes entrance and exit guides at the entrance and exit of said pass tube, said entrance and exit guides having openings smaller in cross section than the inside of said pass tube for defining the axis of said path of travel for said workpiece, and wherein said blanking means comprises a blanking bar extending parallel to said axis and symmetrically disposed with respect to a plane including said axis and passing through the center of said source.

5. Apparatus as in claim 1 wherein said source provides a beam of beta radiation, and wherein said blanking means comprises a radiation absorber having a substantially infinite thickness to said beta radiation.

6. Apparatus as in claim 1 wherein said gauging head is adapted for measurement of a workpiece which is nominally circular in cross section and wherein said blanking means shields said workpiece against radiation from said source which would otherwise impinge diametrically on said workpiece while allowing radiation to impinge thereon in regions equally spaced on either side of the shielded diameter.

7. Apparatus as in claim 1 including collimating means providing a passageway for said beam of radiation between said source and said workpiece, and wherein said blanking means comprises a bar which is substantially opaque to said radiation for splitting said passageway whereby said radiation beam is separated into two parts directed across the extremities of the cross section of said workpiece.

8. In the method of gauging an elongated, traveling workpiece in the form of a rod by guiding said workpiece longitudinally along a path, directing a beam of radiation onto one side of said workpiece and detecting radiation which has interacted with said workpiece, the improvement comprising reducing a central portion of said beam which would otherwise impinge upon a central portion of said workpiece, the extent of said central portion being selected so as to reduce the sensitivity of said gauging process to variations in cross-sectional shape of said workpiece to an acceptable degree without reducing the intensity of the detected radiation to an unacceptable degree.

* * * * *